United States Patent

[11] 3,611,909

| [72] | Inventor | Asa K. Gaylord<br>Portland, Oreg. |
|------|----------|-----------------------------------|
| [21] | Appl. No. | 877,132 |
| [22] | Filed | Nov. 17, 1969 |
| [45] | Patented | Oct. 12, 1971 |
| [73] | Assignee | Gaylord Industries<br>Lake Oswego, Oreg. |

[54] FAIL-SAFE DAMPER CONTROL FOR KITCHEN VENTILATOR
4 Claims, 2 Drawing Figs.

| [52] | U.S. Cl. | 98/115 K,<br>126/299 |
|------|----------|----------------------|
| [51] | Int. Cl. | F23j 11/00 |
| [50] | Field of Search | 98/115 K;<br>126/299 |

[56] References Cited
UNITED STATES PATENTS
3,247,776  4/1966  Gaylord..................  98/115 K

*Primary Examiner*—Meyer Perlin
*Assistant Examiner*—W. C. Anderson
*Attorney*—Lee R. Schermerhorn ABSTRACT: This damper control is a part of a kitchen ventilator associated with a grill and other cooking devices and arranged to exhaust grease smoke and other cooking fumes from the kitchen. A spring-closed damper in the ventilating duct is normally held open by a latch actuated by a solenoid. Upon deenergization of the solenoid by thermostatic switches and other safety devices, or in the event of an electrical fault or power failure, the latch is released causing the damper to close. Thus, a fire in one of the cooking devices will not be drawn into the ventilating duct and any fire in the ventilating duct will be quenched by having its oxygen supply cut off.

PATENTED OCT 12 1971   3,611,909

INVENTOR.
ASA K. GAYLORD
BY

FAIL-SAFE DAMPER CONTROL FOR KITCHEN VENTILATOR

CROSS-REFERENCES TO RELATED APPLICATIONS

The present damper control is an improvement on the fail-safe damper control shown in FIGS. 12 and 13 in my U.S. Pat. No. 3,207,058 issued Sept. 21, 1965, and in FIGS. 8 and 9 in my U.S. Pat. No. 3,247,776 issued Apr. 26, 1966.

BACKGROUND OF THE INVENTION

This invention relates to a fail-safe damper control for a kitchen ventilator.

The prior patents referred to above disclose a fail-safe damper control having a solenoid with a horizontal sliding armature. The solenoid must be energized in order to latch the damper open against the force of a damper-closing spring. Upon deenergization of the solenoid, the armature is actuated by a second spring causing a wedge-shaped nose on the armature to cam a gravity latch upward to release position, allowing the damper spring to close the damper.

Objects of the present invention are to provide an improved fail-safe damper control, to provide a damper control having fewer moving parts and to provide a fail-safe release mechanism which is less complicated and expensive to manufacture and which is more reliable and trouble-free in operation.

SUMMARY OF THE INVENTION

The present improvement resides in the emergency damper release mechanism which allows the damper to close in case of emergency when the solenoid is deenergized, either by the actuation of some safety device, by power failure, or by a fault in some electric wire or circuit connection. Instead of utilizing a horizontally slidable and spring-actuated solenoid armature to retract the damper latch by cam action, the present device employs a direct-acting solenoid armature resiliently connected to the latch. When the solenoid is deenergized, the armature releases the latch without the complication and added friction of intermediate sliding parts. The resilient connection permits the latch to be released manually as in the prior patents. Improved latch geometry substantially overcomes latch friction.

The invention will be better understood and the foregoing and other objects and advantages will become apparent from the following detailed description of the preferred embodiment illustrated on the accompanying drawing. Various changes may be made in the details of construction and arrangement of parts and certain features may be used without others. All such modifications are included in the invention.

DESCRIPTION OF THE PREFERRED EMBODIMENT

Figure 1:
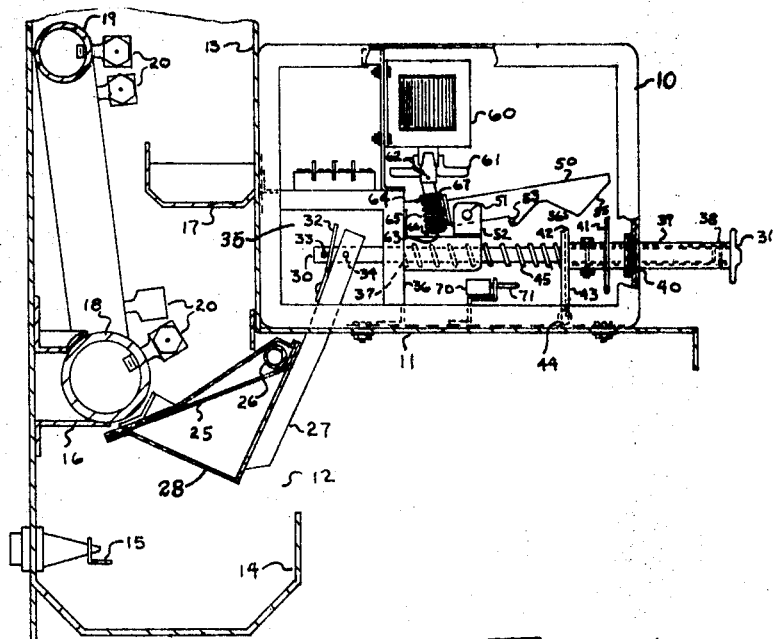
FIG. 1 shows a fail-safe damper control embodying the principles of the invention, the damper in closed position and the solenoid being deenergized.

The present damper control is contained in a housing 10 mounted on a shelf 11 which extends over one or more cooking devices, such as grills and the like. The shelf 11 deflects rising fumes and grease smoke from the cooking operations into the inlet opening 12 of a ventilator 13 which is equipped with an exhaust fan, not shown. The lower end of the ventilator has a grease trough 14 equipped with a grease detector electrode 15.

Inside the ventilating duct above the inlet opening 12 are mounted a lower stationary grease-extracting baffle 16 on the backwall and an upper stationary grease-extracting baffle 17 on the front wall. Baffle 16 includes a pipe 18 for cleaning and fire-extinguishing fluid, such as steam. Both the pipe 18 and an upper pipe 19 are equipped with nozzles 20 arranged to spray the grease-collecting surfaces of the ventilating duct 13 and other parts subject to the accumulation of combustible grease.

Figure 2:
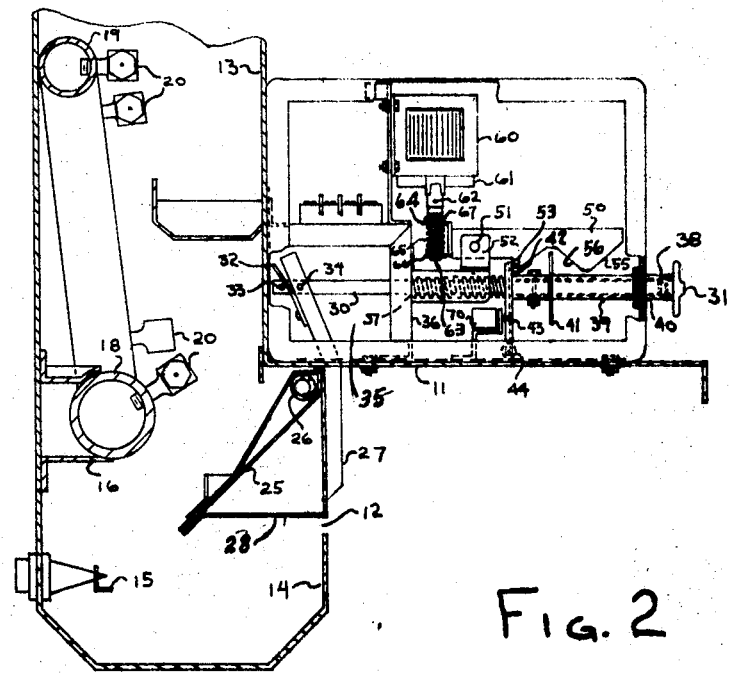
FIG. 2 shows the damper control in normal operating condition with the damper open and solenoid energized.

A grease-extracting damper baffle 25 is mounted on a horizontal shaft 26 which is in turn mounted for rotation in suitable bearings. A damper arm 27 is mounted on an L-shaped bracket 28 on damper baffle 25. Bracket 28 is only about 2 inches wide whereby it does not obstruct the flow of incoming air through inlet opening 12 when the damper is in open position as shown in FIG. 2.

Arm 27 projects upwardly through slots in shelf 11 and the bottom wall of control housing 10 for connection with a sliding control rod 30 having an operating knob 31. Arm 27 is channel shaped in cross section with its web portion provided with a vertical slot to receive the rod 30. Attached to the back side of this web portion is similarly slotted spring tongue 32. A pivotal connection is effected between arm 27 and rod 30 by means of pins 33 and 34 in the rod, the former engaging tongue 32 and the latter engaging the inside of the channel web. This connection is enclosed in a chamber 35 having a front wall 36 provided with an opening 37 which forms a rear bearing support for the rod 30.

The front end of rod 30 terminates at 38 within a tube 39 connected with the knob 31. Tube 39 is supported for sliding movement in an opening at 40 through the front wall of housing 10. This arrangement provides a telescopic lost motion connection between rod 30 and knob 31. Inward movement of knob 31 relative to rod 30 is limited by the inner end 38 of the rod and outward movement of the knob from the front wall of housing 10 is limited by a circular latch release cam plate 41 on tube 39.

Connected with the rod 30 is a latch plate or catch projection 42 having a lower extension 43 equipped with rollers 44 to roll on the bottom wall of housing 10 and prevent rod 30 from rotating. The purpose of this is to maintain the pins 33 and 34 horizontal and at right angles to the arm 27 and to hold the latch plate 42 upright. Rod 30 carries a compression spring 45 confined between the stationary wall 36 and latch plate 42. When the latch plate is released as shown in FIG. 1, this spring swings the damper baffle 25 to closed position with its lower edge bearing against the under side of pipe 18 which is a part of the baffle 16.

The parts thus far described correspond to the form of construction in my prior patents mentioned above.

Damper baffle 25 is normally latched in open position as shown in FIG. 2 by a latch bar 50 which is pivotally mounted intermediate its ends on a pin 51 in a bracket 52 on the wall 36. Pin 51 is more remote from rod 30 than the top edge of latch plate 42 for a reason which will presently appear. The under side of latch bar 50 is provided with a bronze hook-shaped detent 53 to engage and slide on a polished tempered steel surface on the latch plate 42. At its outer end the lower edge of latch bar 50 is provided with outer and inner cam faces 55 and 56 to cooperate with release cam plate 41. Another cam face 57 is disposed outward from detent 53.

Mounted above the inner end of latch bar 50 is a solenoid 60 having a vertically movable armature 61 pivotally connected at 62 with the upper end of trip link 63. Trip link 63 passes slidably through a hole in a bracket 64 on the inner end of latch bar 50 on the left side of pivot 51. The lower end of trip link 63 is equipped with a head 66 to confine a compression spring 65 between head 66 and bracket 64. Spring 65 presses bracket 64 against a stop 67 on link 63 in FIG. 1.

A normally open switch 70 has an actuating plunger 71 arranged for engagement by the lower end portion 43 of latch plate 42. Switch 70 is in a holding circuit for the fan relay as described in the above-mentioned prior patents. Opening switch 70 stops the ventilating fan in duct 13.

When the ventilator is operating, solenoid 60 is energized and the various parts are in the positions shown in FIG. 2. Solenoid armature 61 is in raised position compressing spring 65 to raise stop 67 above bracket 64 and holding detent 53 engaged in front of latch plate 42 on slide rod 30. Slide rod 30 thus held in its leftward position holds damper baffle 25 open for the free flow of cooking fumes and smoke into the ventilator through inlet opening 12. Within the duct 13 the airflow follows a tortuous path around the lower edge of damper baffle 25, around lower stationary baffle 16 and around upper stationary baffle 17 causing smoke particles and grease droplets to be separated out of the airstream by centrifugal force and deposited on the baffles and walls of the duct 13. This grease-extracting portion of the ventilator is cleaned periodically by sprays of steam or hot water and detergent from nozzles 20.

Damper baffle 25 may be closed manually by pulling out on knob 31. The outward movement of tube 39 causes cam plate 41 to engage cam surface 56 and raise latch bar 50. The raising of latch bar 50 disengages detent 53 from latch plate 42, allowing spring 45 to move slide rod 30 rightward and swing damper baffle 25 clockwise to its closed position in FIG. 1. Such manual release does not overpower and move the solenoid armature 61. The raising of latch bar 50 by cam plate 41 causes bracket 64 to further compress the trip link spring 65 without pulling link 63 and armature 61 downward. The rightward movement of latch plate 42 opens fan switch 70 to stop the ventilating fan.

The damper may be reopened after manual closing by pushing in knob 31. Knob 31 then engages the end 38 of slide rod 30, moving the slide rod leftward until latch plate 42 is engaged behind detent 53 of the latch bar 50. During this leftward movement of tube 39 and slide rod 30, the latch bar 50 is momentarily lifted by sliding engagement of cam plate 41 with cam surface 55 and the sliding engagement of latch plate 42 with cam surface 57.

In case of emergency, the solenoid 60 is deenergized. As described in said prior patents, such deenergization may be caused by rise of the grease level in trough 14 to contact grease detector electrode 15, actuation of a thermostatic switch by fire in the duct 13, by power failure or by a fault in the electrical system. When solenoid 60 is deenergized, spring 65 draws armature 61 down rapidly, causing the raised stop 67 in FIG. 2 to strike the top of bracket 64. This downward impact on the left side of pivot 51 raises the right end of latch bar 50, disengaging detent 53 from latch plate 42, whereupon spring 45 shifts slide rod 30 rightward to close damper baffle 25 against pipe 18 as shown in FIG. 1.

The rightward movement of latch plate 42 opens fan switch 70 to stop the ventilating fan. Simultaneously, the control circuits in said prior patents open a solenoid valve to supply fire-extinguishing and cleaning fluid to pipes 18 and 19 and spray nozzles 20. After such emergency operation, the system is returned to functioning condition by reenergizing solenoid 60 and pushing in the extended knob 31.

The purpose of locating latch bar pivot 51 above the top edge of latch plate 42 is to counteract the frictional force opposing sliding movement of detent 53 on the latch plate. In said prior patents the top edge of the latch plate is on the same level with the latch bar pivot whereby the lifting force applied to the latch bar must be sufficient to overcome the entire amount of the frictional force. In the present construction with the point of contact between detent 53 and latch plate 42 below pivot 51, the force of damper spring 45 on latch plate 42 exerts a turning moment on latch bar 50 in a counterclockwise direction tending to raise the right end of the latch bar.

In more general terms this relationship may be defined as locating the latch plate projection closer to the slide rod than the latch bar pivot. It is not necessary to position latch bar 50 above control rod 30 and it is not essential that solenoid 60 be in vertical position. Housing 10 may be turned over, on its side, on end, or mounted in any other position without affecting the operation of the mechanism.

It will be apparent that by raising pivot 51 still higher, the sliding friction of detent 53 on latch plate 42 may be overcompensated, causing the turning moment on the latch bar to exceed the sliding friction, if desired. It is preferred, however, to adjust the leverage geometry so that the turning moment is approximately equal to the sliding friction force. This relationship produces secure latching action without requiring an excessively powerful solenoid and minimizes wear and tear on the parts. On the other hand, if the sliding friction is undercompensated by the turning moment, the latch bar will be raised by the downward impact of stop 67 against bracket 64 as described above.

Having now described my invention and in what manner the same may be used, what I claim as new and desire to protect by Letters Patent is:

1. In a kitchen ventilator having a damper arranged to close and open the ventilator, spring means for closing said damper, a slidably mounted control rod having an inner end connected with the damper for opening the damper by inward sliding movement of the control rod, a member slidably mounted on the outer end of said control rod, a knob on the outer end of said member forming a stop engageable with the outer end of said control rod to limit the inward movement of said member relative to said control rod, and a catch projection on said control rod; the improvement comprising a latch bar extending alongside said control rod, a pivotal support for said latch bar, a detent on said latch bar arranged to engage said catch projection for holding the damper open against the closing force of said damper-closing spring means, said damper-closing spring means causing said catch projection to exert a turning moment on said latch bar in a direction to disengage said detent from said catch projection, a sloping cam surface on said latch bar, a cam plate on said member engageable with said cam surface by outward sliding movement of said member on said control rod when said knob is pulled outward to swing said latch bar and release said detent from said catch projection so that said damper spring will close the damper causing said control rod to slide outward, said damper being opened by pushing said knob inward against the outer end of said control rod, a solenoid having a reciprocal armature, and a link interconnecting said armature and said latch, said link having a spring arranged to resiliently hold said detent in engagement with said catch projection when said solenoid is energized whereby said last spring may be overpowered by said cam plate so that said control rod may be unlatched for closing said damper by manual actuation of said knob without moving said armature while said solenoid is energized, said armature releasing said detent from engagement with said catch projection when the solenoid is deenergized.

2. The structure of claim 1, said link extending slidably through a portion of said latch bar, a head on said link on one side of said latch bar, and an abutment for said latch bar on said link on the opposite side of said latch bar, said spring being a coil spring on said link compressed between said head and said latch bar.

3. In a kitchen ventilator having a damper arranged to close and open the ventilator, spring means for closing said damper, a slidably mounted control rod having an inner end connected with the damper for opening the damper by inward sliding movement of the control rod, a member slidably mounted on the outer end of said control rod, a knob on the outer end of said member forming a stop engageable with the outer end of said control rod to limit the inward movement of said member relative to said control rod, and a catch projection on said control rod; the improvement comprising a latch bar extending alongside said control rod, a pivotal support for said latch bar, a detent on said latch bar arranged to engage said catch projection for holding the damper open against the closing force of said damper-closing spring, means a sloping cam surface on said latch bar, a cam plate on said member engageable with said cam surface by outward sliding movement of said member on said control rod when said knob is pulled outward to swing said latch bar and release said detent from said catch projection so that said damper-closing spring means will close the damper causing said control rod to slide outward, said damper being opened by pushing said knob inward against the outer end of said control rod, a solenoid having a reciprocal armature, a link interconnecting said armature and said latch bar, a spring on said link arranged to resiliently hold said detent in engagement with said catch projection while said solenoid is energized whereby said spring may be overpowered by said cam plate so that said control rod may be unlatched for closing said damper by manual actuation of said knob without moving said armature while said solenoid is energized.

4. A kitchen ventilator comprising a ventilating duct, a damper in said duct, a slidable control rod connected with said damper for closing and opening the damper, spring means for closing the damper, a latch plate on said control rod, a latch bar extending alongside said control rod, a pivotal support for said latch bar adjacent said control rod, a detent on said latch bar engageable with said latch plate to hold the damper open, said damper-closing spring means causing said latch plate to exert a turning moment on said latch bar in a direction to disengage said detent from said latch plate, a solenoid having a reciprocal armature, and a link interconnecting said armature and said latch bar, said link having a spring-biased lost motion connection with said latch bar wherein said last spring is compressed by said armature to hold said detent in engagement with said latch plate when the solenoid is energized, said last spring causing said armature to transmit an impact against said latch bar in a direction to disengage said detent from said latch plate when said solenoid is deenergized.